Figure 1:
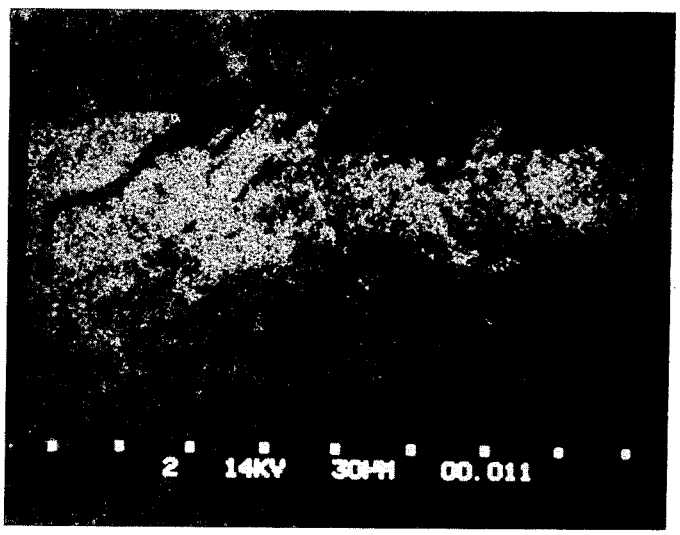

United States Patent [19]

Bucci et al.

[11] 4,221,123

[45] Sep. 9, 1980

[54] SEPARATOR MATERIALS FOR SECONDARY ALKALINE BATTERY SYSTEMS AND METHOD OF ANALYTICALLY DETERMINING THE SUITABILITY OF SUCH MATERIALS

[75] Inventors: Giuseppe D. Bucci, Hanover Park; James D. Bolstad, Algonquin, both of Ill.

[73] Assignee: Gould Inc., Rolling Meadows, Ill.

[21] Appl. No.: 945,978

[22] Filed: Sep. 26, 1978

Related U.S. Application Data

[63] Continuation-in-part of Ser. No. 838,351, Sep. 30, 1977, abandoned.

[51] Int. Cl.$^3$ .............................................. G01N 15/08
[52] U.S. Cl. ........................................ 73/38; 429/254
[58] Field of Search ............... 429/254; 73/38, 432 R; 250/306, 307, 311, 338; 324/29, 62 R; 204/1 T

[56] References Cited

U.S. PATENT DOCUMENTS 3,427,206    2/1969    Scardaville ..................... 429/254

*Primary Examiner*—Gerald Goldberg
*Assistant Examiner*—Joseph W. Roskos
*Attorney, Agent, or Firm*—Augustus J. Hipp

[57] ABSTRACT

An analytical system for determining whether separator materials should function satisfactorily in the alkaline environment of a secondary alkaline system comprises determining the rate at which zinc diffusion is occurring as well as whether or not the separator material is serving as a complete barrier. The overall analytical sequence also includes determining the following characteristics of the separator material: (1) freedom from either defects in the film or pores with larger than acceptable sizes, (2) suitability of the porosity, (3) satisfactory electrolyte transport, and (4) satisfactory resistance to chemical attack in the operating environment of the cell or battery system.

10 Claims, 3 Drawing Figures

SEPARATOR MATERIALS FOR SECONDARY ALKALINE BATTERY SYSTEMS AND METHOD OF ANALYTICALLY DETERMINING THE SUITABILITY OF SUCH MATERIALS

This is a continuation-in-part of application Ser. No. 838,351, filed Sept. 30, 1977 and now abandoned.

This invention relates to secondary alkaline battery systems and, more particularly, to novel separator materials selectively porous to electrolyte for use therein and to analytical methods for determining the suitability of separator materials.

The secondary alkaline batteries are particularly suited for a wide variety of applications ranging from power generation in air-borne and submersible systems to use in portable tools and appliances to engine starting and, importantly, to electrical vehicle propulsion, due to the high energy densities which can be achieved. Typical electrode combinations include silver-zinc, silver-cadmium and nickel-zinc.

Nickel-zinc batteries have shown particularly outstanding potential. This potential has, however, not been commercially realized. Thus, the use of zinc electrodes in secondary batteries has been severely limited by their failure to withstand repeated cycling without an irreversible loss of capacity upon repeated recharge. The difficulty in achieving satisfactory cycle life becomes more pronounced for applications requiring relatively deep discharge cycles.

The decline in capacity as the cycle life of the battery system progresses is associated largely with such life limiting processes as separator degradation and zinc electrode shape changes. Of all the technical difficulties facing the economic commercial utilization of the nickel-zinc system, the life limitation due to the degradation of the separators employed is perhaps the most important problem.

Thus, as is known, in nickel-zinc battery systems using conventional aqueous solutions, such as potassium hydroxide, as an electrolyte, the zinc material is soluble in the electrolyte to a significant extent during discharge. Some of the active zinc material thus tends to enter the electrolyte while the battery system is being discharged and while the system stands in a discharged condition. Upon recharging of the battery system, these zinc specie in the electrolyte return to the zinc electrode but not without altering the electrode structure. And moreover, the replating or redeposition of zinc often occurs in the form of treed or branched crystals having sharp points (dendrites) which can readily form a bridge between the plates of opposite polarity, thereby causing short circuits and the destruction of the cell. Indeed, other than chemical degradation in the alkaline electrolyte, it is almost uniformly believed that the formation of dendrites is the major cause of failure of such battery systems.

A satisfactory material for a separator in the nickel-zinc system must be capable, according to accepted theory, of preventing dendrite penetration yet allow electrolyte permeation therethrough, desirably being wetted by the electrolyte. Still further, as is known, in addition to the shape change of the zinc electrodes, the nickel electrodes undergo expansion to some extent during operation of the cell or battery. Accordingly, an adequate separator material must be capable of tolerating such change and expansion without significantly altering the other characteristics required.

To satisfy these diverse and rigorous requirements, a useful separator material for long cycle life applications must possess a relatively uniform, and extremely small, "pore" size, have low resistance to electrolyte transport and possess the strength and flexibility characteristics required to accommodate the shape changes of the zinc anodes and the expansion of the nickel cathodes. And, all of these properties must be provided in as thin a layer as is possible so as not to significantly lessen the volumetric energy density. To further complicate the picture, commercial requirements dictate that the material be capable of being economically formed into a thin separator layer within acceptable quality control tolerances.

An awesome amount of effort has been directed to providing satisfactory separator materials for secondary alkaline battery systems. This is perhaps a testimonial to the difficulty which has been encountered in providing a satisfactory material which possesses the many diverse characteristics required for efficient functioning as a separator. The proposed solutions have ranged from providing various organic microporous films to relatively rigid layers of inorganic, often ceramic, particles bonded together in some fashion. A still further solution involves combining an organic material with inorganic particles to form what is often termed an inorganic/organic separator material or more simply, an I/O separator material. Yet other solutions involve either forming various types of laminates or utilizing a plurality of layers of different materials.

Substantial work has been done with separators made from polyethylene that has been cross linked and grafted with acrylic acid using radiation. As the acrylic acid is grafted only in the amorphrous regions of the polyethylene, and not in the crystalline regions, the resulting separator contains an irregular distribution of different sized "pores".

Some rather extraordinary claims have been made for particular solutions, the separators being said to be capable of providing cycle life up to several thousand cycles. However, the data supporting these claims must be carefully reviewed. As an example, the cells subjected to shallow discharges do not present service conditions that even adequately test many of the commercially available separator materials. On the other hand, the conditions encountered with a battery system of the type that would be used for electric vehicles, together with the conditions involved in the usage of such battery systems, provide an extremely rigorous test of the capability of the separator material.

At the present time, and despite the considerable effort in this field, the development of an economically viable separator material for secondary alkaline systems remains as a principal obstacle to the widespread utilization of such battery systems. Suitable commercial separator materials for alkaline battery systems are simply unavailable, except at unacceptably high prices.

Moreover, in developing the many materials which have been suggested for use in secondary alkaline systems, there has been no appreciation of all the principal requirements that are involved. Short of undergoing extensive and time consuming cell testing, there is presently no satisfactory collection of accepted techniques for evaluating a particular separator material to ascertain if the material possesses the many characteristics required. Still further, even if cell testing has shown the utility of a particular type of separator material, there are no quality control testing means available to insure that the preparation of a second sample of the material will also possess such characteristics. This is not to say that various analytical tests for determining the suitability of separators for secondary alkaline battery systems are unknown. Many tests are certainly known. However, there has not been developed heretofore an acceptable series of analytical determinations that would satisfactorily evaluate if a particular separator sample possesses the many desired characteristics.

It is accordingly a principal object of the present invention to provide separator materials for secondary alkaline battery systems capable of achieving relatively long cycle life under conditions of deep discharge.

Another object provides for such systems separator materials possessing satisfactory characteristics for use with cells of the size employed in electric vehicle applications.

A further object of this invention lies in the provision of separator materials capable of being economically produced. A related and more specific object is to provide separator materials capable of being produced within acceptable tolerances.

Yet another object is to provide reliable analytical means for determining the utility of a particular separator material without the need to undergo extensive cell testing.

Figure 2:
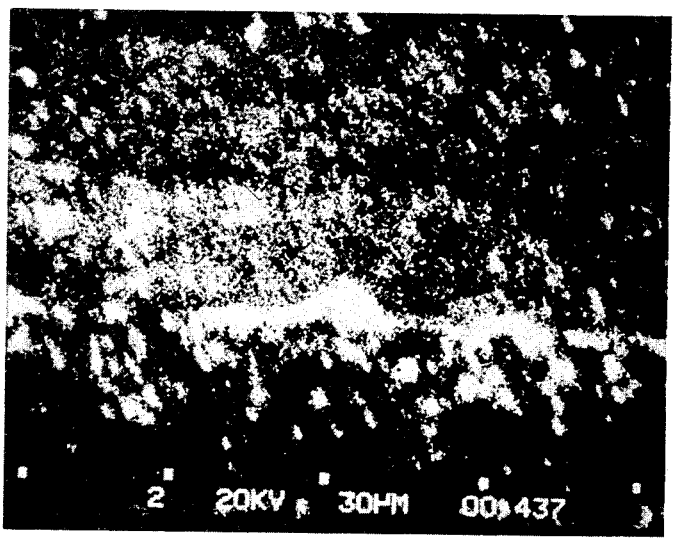
Figure 3:
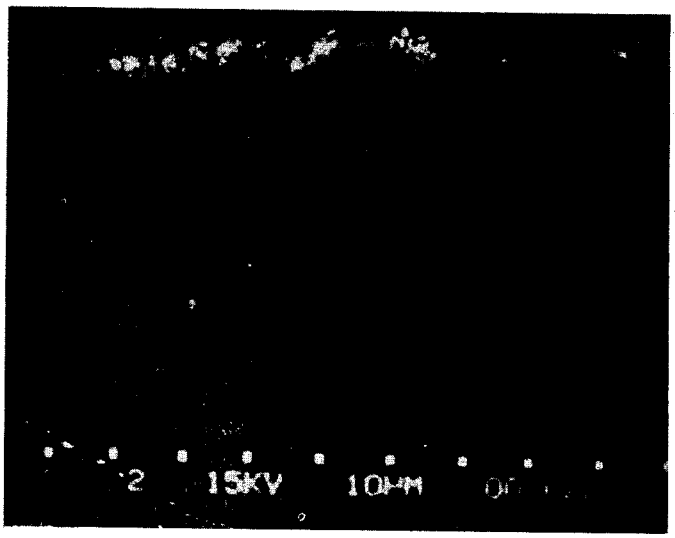

Other objects and advantages of the present invention will become apparent from the ensuing description and from the drawings in which:

FIG. 1 is a photomicrograph, at 450X amplification, of an elemental zinc x-ray map generated by electron microprobe of the thickness of a multiple layer separator and depicting a dendrite mode of failure (the surface of the separator adjacent to the zinc electrode being at the bottom and that against the nickel electrode being at the top);

FIG. 2 is a photomicrograph, at 850X amplification, similar to FIG. 1, except illustrating the result of the deposition and/or precipitation of free zinc specie within the "pores" of the separator; and FIG. 3 is a photomicrograph, at 1000X amplification, similar to FIG. 1, except showing the appearance when the separator material functions as a complete barrier in accordance with the present invention.

While the invention is susceptible of various modifications and alternative forms, specific embodiments thereof are described in detail herein. It should be understood, however, that it is not intended to limit the invention to the particular forms disclosed, but, on the contrary, the intention is to cover all modifications, equivalents, and alternatives falling within the spirit and scope of the invention as expressed in the appended claims. Thus, for example, while the present invention will be principally described in connection with a nickel-zinc secondary rechargable battery system, it should be appreciated that the present invention may likewise be employed alone or in combination with other separator materials or with other battery electrode combinations requiring a separator material having some or all of the characteristics described.

The present invention is, in part, predicated on the discovery that the premature failure of separator materials in secondary alkaline systems does not always occur via dendrite penetration as accepted theory leads those in the field to believe but, rather, in many cases, is the result of deposition or precipitation of free zinc specie within the "pores" of the separator, creating a current leakage path which can significantly contribute to the decrease in the capacity of a cell. Indeed, with a significant buildup combining with the physical change of the electrodes, a short circuit can result. A principal feature of this invention accordingly provides certain organic, polymeric materials which are useful as separator materials and prevent the penetration of free zinc specie into the "pores" of the separator material, thus serving as a total electronic insulator. In general, the novel separator materials of this invention comprise a copolymer formed with a relatively high molecular weight, non-hydrolyzable and non-oxidizable polymer backbone having pendant chains, with terminal polar groups.

While the polymer structure generally described should provide a satisfactory material for secondary alkaline cell or battery systems if properly processed, the problem of quality control obviously presents a potentially significant problem when forming separator materials on a commercial scale. To obviate this problem, the present invention, according to one feature, provides an analytical system for determining whether or not the material should function satisfactorily in the intended environment. The details of this analytical system will be described following the discussion of the novel separator materials of this invention.

Considering first the backbone component, a variety of polymer materials may be utilized. The prime requirements are that the polymer be itself insoluble in the alkaline electrolyte employed and of sufficient average molecular weight so as to provide chemical stability in the presence of the electrolyte. Thus, for example, if the polymer backbone is too low in molecular weight, the salt formed, when exposed to an alkaline electrolyte such as potassium hydroxide, could go into solution, thereby, irreversibly degrading the separator material. It has been found sufficient to utilize as the backbone a polymer having a weight average molecular weight of at least 20,000. Suitable backbone polymers can be formed from olefins such as polyethylene, polypropylene or the like. A backbone polymer having branched phenyl or alkyl groups may also prove useful due to the additional stability provided. A suitable material of this type is polystyrene.

In addition, the backbone polymer should be relatively non-hydrolyzable and non-oxidizable in the presence of the alkaline electrolyte used. For this reason, the backbone polymer should be free of polar groups within the chain unless the particular type of polar group is non-hydrolyzable and non-oxidizable. Accordingly, it is not preferred to use polyamides or polyvinyl acetates for the backbone polymer since hydrolysis will eventually occur, thereby restricting the use of such materials to the shorter cycle life applications. Similarly, it is not preferred to utilize polyvinylchloride since dehydrohalogenation will occur in an alkaline environment.

As to the pendant polar groups, many useful polar moieties are known. As representative examples,

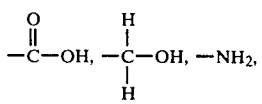

conjugated double and triple bonds (except phenyls),

and other moieties wherein the electronegative atoms such as oxygen have a partial negative charge and the carbon has a partial positive charge may be employed. The incorporation of the polar groups imparts wettability by the alkaline electrolyte solutions employed, thereby decreasing the resistance to to electrolyte transport to acceptable levels. While the functional polar group could be located anywhere along the side chain attached to the backbone of polymer chain, optimum results are provided when the polar group is on the terminal carbon on the side chain, thereby obviating any possible adverse steric hindrance effects when the side chain is branched. As is thus apparent, a suitable side chain can comprise any of the materials used to form the polymer backbone. Side chains may or may not be required depending on the particular composition of the copolymer. The non-oxidizable, non-hydrolyzable character of the side chain per se is less critical than is the case with the backbone, hydrolysis or oxidation of the side chain typically resulting in only somewhat unpredictable performance as regards electrolyte transport. The frequency of the pendant groups containing the polar moiety as well as the regularity along the polymer backbone can be varied as desired. However, from a functional standpoint, the greater the frequency and the regularity, the greater the rate of ion transport will be. In this latter respect, it should be appreciated that increasing frequency and regularity of pendant groups requires a satisfactorily increased chain length and/or branched inert groups such as phenyls or alkyls for the polymer backbone to offset the resulting increased solubility.

Techniques for preparing suitable materials are known. A suitable material can be prepared by copolymerizing, for example, ethylene and acrylic acid to form a backbone polymer having the requisite molecular weight with the pendant polar carboxyl groups. Monomer compositions containing 17-20 weight percent acrylic acid and the remainder ethylene have been found satisfactory.

It is not preferred to prepare the separator material by grafting side chains containing the polar groups onto a preformed backbone polymer of the desired weight. The side chains would be grafted only in the amorphous regions of the preformed polymer and not in crystalline regions. Accordingly, the "pores" in the crystalline region would differ from those in the amorphous region, thereby forming a separator with an inhomogeneous distribution of irregularly sized "pores". Separator materials made by the formation of a copolymer, such as from ethylene and acrylic acid, however, contain regularly sized "pores" in a relatively homogeneous distribution.

To prepare the separator material, the material used can suitably be cast into a film of the desired thickness in a fashion which insures the presence of the requisite porosity. Typically, suitable thicknesses for the separator material will be in the range of from about 1 to 5 mils. The average "pore" size should accordingly, it has been discovered, be in the range of no more than about 100 Angstroms, as may be determined by water penetration with verification by high resolution transmission electron microscopy. Indeed, the "pores" are so small that it is probably more appropriate to consider the separator materials as being ion permable as opposed to being termed microporous. For this reason, in accordance with the invention, suitable separator materials will be termed as being selectively porous to electrolyte materials. More specifically in this situation, the separator permits the potassium and hydroxyl ions to freely pass (viz.—provides satisfactory electrolyte transport characteristics) but substantially excludes zinc or zincate ion passage. This selective porosity is a function of hydrophilic regions resulting from a localized concentration of polar groups. It should be further appreciated that, while references will be made to "pores" and "pore" size, it may be more appropriate to consider the pores as domains or the "pore" size as an effective "pore" size. The ability of a "pore" or domain to exclude a particular ion is thus not only a function of its physical dimensions but also a function of its ionic environment.

Suitable materials with the requisite porosity can be formed by first preparing a solution and/or emulsion of the polymer material, then casting the material onto a suitable surface and finally removing the solvent. Also, a suitable material may be prepared by incorporating a fabric material as a substrate onto which the polymer solution or emulsion is coated. This may be accomplished by simply dipping the fibrous support into the polymer solution or emulsion. Still further, suitable separator materials may be formed by extrusion techniques.

If the material used is selected in accordance with this teaching and the film preparation is carefully carried out, the resulting separator material should be capable of allowing a secondary alkaline cell to have a relatively long cycle life, even under deep discharge conditions. However, due to the many variables involved, this may or may not actually be the case. For this reason, in accordance with one principal aspect of this invention, there is provided an analytical sequence which will indicate whether the separator material should perform satisfactorily. This sequence is designed to, in general, determine the following characteristics of the separator material:

(1) freedom from either defects in the film or pores with larger than acceptable sizes, (2) suitability of the porosity, (3) satisfactory electrolyte transport characteristics, (4) satisfactory resistance to chemical attack in the operating environment of the cell or battery system and (5) satisfactory inhibition to penetration of dissolved zinc specie into the separator material.

If a separator material passes this analytical sequence, secondary alkaline cells using such materials should be capable of enduring for several hundred deep discharge cycles before failure due to the separator functions will result.

To determine the freedom from surface defects or overly large "pores" that would be susceptible to dendrite penetration or the like, a suitable separator material should not permit gas penetration below a pressure of 20 p.s.i. when subjected to bubble pressure testing. This testing is carried out by placing the separator material in a cup-shaped receptacle having a means for passing nitrogen or any other suitable inert gas upwardly through the separator material being tested. A support screen is placed over the separator and a layer of water is added over the screen and separator material. The gas pressure is increased while the water layer is visually observed. If bubbles are observed a pressure below 20 p.s.i., the material is unsatisfactory. Such bubble formation would occur only if the tested material had major structural defects.

The adequacy of the porosity must be determined to insure that the soluble zinc specie are not allowed to penetrate into the pores of the material. Significant zinc penetration over a relatively short time period, such as 12 hours, indicates that the tested separator material is unsatisfactory. A preliminary determination of the suitability of the porosity is determined by a conventional water penetration test. Satisfactory verification can be obtained by high resolution transmission electron microscopy. For suitable separator performance the "pore" size should be no larger than, preferably, 0.01 micrometer (100 Angstroms).

To determine whether the electrolyte transport characteristics are satisfactory (principally determining the suitability of the frequency and regularity of the polar groups), the separator material should be subjected to conventional testing of electrical resistance. Measurement of the electrical resistance of separator material by the direct current method has been regularly employed. Measurement of resistance is made by comparing the resistance of an electrolyte path with or without one or more thicknesses of the separator material to be tested in the path in 31% KOH. It is also possible to measure the resistivity of the separator materials at various points so as to determine the uniformity of electrolyte transport. Non-uniform electrolyte transport can seriously impair battery efficiency and life. Satisfactory characteristics are provided when the resistivity value is, optimally, about 0.3 ohm-cm.$^2$ or less, preferably less than 0.1 ohm-cm.$^2$ Separators with values over 0.9 ohm-cm.$^2$ are unsatisfactory.

Satisfactory resistance to chemical attack in the cell or battery environment is determined by exposing the separator material to the alkaline electrolyte to be employed at elevated temperatures for an extended period of time. For example, when utilizing potassium hydroxide as the electrolyte, it has been found unsatisfactory to immerse the separator materials in a 25 to 45 percent aqueous potassium hydroxide solution at a temperature of 80° C. for a period of 24 hours. The effect of this testing is then determined by infrared spectroscopy and scanning electron microscopy. Any degradation can be determined by comparing the material prior to the immersion testing with the material after testing.

Chemical degradation has been observed using conventional infrared spectrographic techniques by comparing the spectra of separator material before and after heat treatment in KOH (24 hours in 30% KOH at 80° C.). It is important that the untreated material be in the potassium salt form because there are spectral differences between the acid and potassium salt form. For the infrared spectrographic analysis of ethylene-acrylic acid copolymer separators, it has been determined that there is an absorption band at 1700 wavenumbers cm$^{-1}$ that corresponds to a stretch band for terminal carboxyl groups. These terminal carboxyl groups would be degraded well before the polymer backbone structure. Such degradation would be evidenced by a significant decrease in the absorption of the 1700 wavenumber cm$^{-1}$ band. Separator copolymers using different polar groups would be similarly analyzed for chemical degradation using infrared spectroscopy. The specific absorption bands followed would differ with the composition of the particular polar group.

The use of scanning electron microscopy will determine whether changes have occurred in the physical appearance of the separator material after heat treatment in KOH (24 hours at 80° C. in 31% KOH). The appearance of surface etching, fractures, or holes would indicate that the separator material has been degraded.

The other test employed, termed, for convenience, "zinc diffusion", forms a principal aspect of the present invention; and this analysis, in conjunction with the average pore size measurements, determines if the separator material satisfactorily resists penetration by soluble zinc specie so that the deposition within the pores of the material of free zinc specie is prevented. Two different means may be employed to analyze zinc diffusion.

The first is to measure zinc diffusion directly in a diffusion cell with a zinc sensitive electrode at ambient temperature. A suitable cell would have, on one side, the alkaline electrolyte solution, such as, for example, potassium hydroxide (31%) and, on the other side, a similar solution which also contains a concentration of the soluble zinc specie (0.65 molar); the cell being separated by one layer of the separator material being tested. Zinc diffusion is determined by the increase in voltage at the zinc sensitive electrode. The tested separator material is compared to a standard separator, such as the microporous polypropylene "Celgard" separator, which permits significant zinc diffusion. If a tested separator displays significant zinc diffusion 12 hours which approximates that of the "Celgard" standard, it has been observed that the separator will not satisfactorily prevent the deposition of the free zinc specie that is desired. It is also possible to measure zinc diffusion in a diffusion cell by atomic absorption, provided that the KOH electrolyte is first substantially diluted.

Zinc diffusion in accordance with the present invention is further characterized by using microprobe analysis to develop an elemental zinc x-ray map. After the separator has been run in a secondary alkaline system for a prescribed period, it is then removed; and microprobe analysis is used to develop a photomicrograph of the elemental zinc x-ray map. Thus, the position of zinc specie in the separator material is visualized. FIGS. 1 through 3 are examples of such photomicrographs.

A suitable separator material must serve as a complete barrier to such penetration so that the elemental x-ray map must show the total absence of any free zinc, whether in the elemental form, combined as zinc oxide or as any other specie. As used herein, the term free zinc specie thus refers to any species that would appear on an elemental x-ray map. The minimal period a separator should be exposed to zinc to establish its suitability is 20 full charge-discharge cycles. The cells contained one positive and two negative electrodes which were run at 100% depth of discharge. If free zinc specie do not appear on the elemental X-ray map, the separator material is considered as a complete barrier within the present invention.

Utilization of these two methods permits determination of the rate at which zinc diffusion is occuring as well as whether or not the separator material is serving as a complete barrier. More particularly, the microprobe analysis shows the cumulative effect of any free zinc specie that have been retained within the "pores". The potentiometric testing allows an indication of cycle life performance to be developed. Thus, if the rate of penetration is sufficiently low, while providing less than optimum performance, the separator material may be satisfactory for the cycle life requirements of some applications. Also, and importantly, the potentiometric testing can indicate an unsatisfactory defect allowing zinc penetration that would not show up on the microprobe analysis if the free zinc passed through and was not retained. Finally, microprobe analysis determines the effect of actual secondary alkaline system conditions on the ability of separators to serve as a complete barrier to zinc penetration.

As may be thus appreciated, the prime analytical technique in determining the suitability of the material being tested is the zinc diffusion test as this serves to determine whether or not the use of the separator material will result in cell failure due to free zinc penetration, eventually creating leakage currents of intolerable levels. Accordingly, the utilization of this analytical test alone will provide considerable benefit in determining the suitability of the separator material being evaluated. This may be visually appreciated by reference to the micrographs. Thus, FIG. 1 illustrates, via the various paths at the top of the figure, and adjacent the nickel electrode, a graphic representation of dendritic growth, leading to separator failure.

In contrast, as seen in FIG. 2, and as has been discovered, the primary mode of separator failure is not dendritic growth, but, rather, leakage currents which increase dramatically as the amount of the free zinc specie that have penetrated into the "pores" of the separator increases. As the "islands" of the free zinc specie become spatially closer together, the extent of the leakage current increases with the cell capacity concomitantly decreasing.

In accordance with the present invention, however, separator materials are provided which serve as total barriers to the penetration of free zinc specie, as is illustrated in FIG. 3. Thus, a separator could exist that, by some means, prevented dendrite formation but was subject to failure because it did not prevent zinc penetration and accordingly current leakage path formation.

To obtain all of the benefits of the present invention, it is necessary to carry out the entire analytical sequence. The utilization of this analytical sequence thus provides a quality control system which allows evaluation of the separator materials without the necessity for undergoing time consuming cell testing which is at the very least impractical when forming separator materials in commercial production. It should, of course, be appreciated that the use of cell tests may generally be found desirable to provide more information. However, the test sequence of this invention provides a reliable means, without such actual testing, of positively indicating whether or not a particular separator material should perform satisfactorily. Certainly, a particular sample which fails the test sequence will perform unsatisfactorily.

The following Examples are intended to be merely illustrative of the use of the present invention and are not in limitation thereof.

EXAMPLE 1

To illustrate the use of ethylene-acrylic acid separator materials, 5 ampere hour nickel-zinc cells were constructed with 2 zinc and 1 nickel electrodes.

The separator materials were made by casting a film onto a glass plate. An ethylene-acrylic acid dispersion containing about 17-20 weight percent acrylic acid (based on the total weight of acrylic acid and ethylene) was poured onto the glass plate. A doctor blade was used to achieve the desired wet thickness. The plate was placed in an oven equipped with a fan, maintained at about 180° to 200° F., for about 15 to 25 minutes. After removal from the oven and cooling to ambient conditions, a second layer was cast over the first using the same procedure. The films were removed from the glass plate by soaking in water.

Cells were constructed with the following configuration from the nickel electrode to each zinc electrode: Nickel electrode/"Pellon" nonwoven nylon absorbent interseparator/heat sealed ethylene-acrylic acid film envelope/heat sealed ethylene-acrylic acid film envelope/Zinc electrode. The ethylene-acrylic acid envelopes were completely sealed around the nickel electrode except for the tab. Each film had a thickness of about 2.7 mils.

While the resistivity values were higher than desired (0.5 and 0.7 ohm-cm.$^2$) as were the average pore sizes (0.019 and 0.022 microns—by water penetration), one cell was subjected to deep discharge life testing for some 260 cycles while another cell was life tested for about 150 cycles, followed by a further 50 cycles after an autopsy after 150 cycles and reconstruction of a cell. In both cases, testing indicated that the ethylene-acrylic acid copolymer separator films served as free zinc penetration barriers.

Further samples of ethylene-acrylic acid copolymer films have provided resistivity values averaging 0.17 ohms-cm.$^2$ (3 samples).

EXAMPLE 2

Battery separators comprised of ethylene-acrylic acid copolymers, formed for nickel-zinc cells as described in Example 1, were analyzed for zinc penetration by a potentiometric technique.

The performance of the ethylene-acrylic acid separators were compared with commercially available "Celgard" separators and with ethylene-acrylic acid copolymer separators heat tested in KOH (24 hours at 80° C. in 31% KOH). The zinc penetration rates obtained are indicated below in Table I.

TABLE I

| Separator | Thickness Wet (mil.) | Minutes to Penetration | Zinc Penetration rate, cm./min. |
|---|---|---|---|
| Celgard (2 layers, crisscrossed) | 2.0 | 39 | $1.3 \times 10^{-4}$ |
| Untreated Ethylene-Acrylic Acid Copolymer | 3.0 | 10100<br>16950* | $7.54 \times 10^{-7}$<br>$4.49 \times 10^{-7}$ |
| Heat, KOH treated Ethylene-Acrylic Acid Copolymer | 1.2 | 4715<br>3186* | $6.46 \times 10^{-7}$<br>$9.56 \times 10^{-7}$ |

*Duplicate tests were conducted and the values set forth.

As can be seen, the heat treatment did not significantly effect the ethylene-acrylic acid material. The Celgard separator allowed zinc penetration at substantially higher rates.

EXAMPLE 3

Battery separators comprised of ethylene-acrylic acid copolymer, formed and operated in nickel-zinc cells as described in Example 1, were analyzed for changes in their appearances using scanning electron microscopy and for zinc penetration by microprobe analysis. Separators which had not been run in nickel-zinc cells were compared with separators which had been run in nickel-zinc cells for 40, 70, and 85 cycles. Scanning electron micrographs displayed no significant changes in the appearance of the separators after being run in nickel-zinc cells. Elemental zinc x-ray maps of separator material run for 40, 70, and 85 cycles show no zinc penetration into the separator. There was zinc bound to the surfaces of the separators as is also shown in FIG. 3.

EXAMPLE 4

Battery separators comprised of ethylene-acrylic acid copolymer, formed cells as described in Example 1, were analyzed for chemical degradation using infrared spectroscropy. Spectra for separators heat treated in KOH (24 hours at 80° C. in 31% KOH) were compared with those for untreated separators. The carboxyl groups in the pendant polar groups gave a conspicuous absorption band at 1700 wavenumber $cm^{-1}$. Chemical degradation of the pendant polar groups would give a pronounced decrease in the absorption of the 1700 wave-number $cm^{-1}$ band. No significant change in the absorption of the 1700 wavenumber $cm^{-1}$ band was observed after heat treatment in KOH.

EXAMPLE 5

Battery separators comprised of ethylene-acrylic acid copolymer, formed as described in Example 1, were analyzed for zinc diffusion. Zinc diffusion as a function of time was compared to that for Celgard separators made of microporous polypropylene. The rate of zinc diffusing through the ethylene-acrylic acid copolymer separator was substantially less than the zinc diffusion rate for Celgard. It took 120 hours of zinc diffusion through the ethylene-acrylic acid polymer to reach the level of zinc that had diffused through Celgard after 100 minutes. The level of zinc diffusion through the two types of separators as a function of time is indicated below in Table II.

TABLE II

| A. Diffusion Through Celgard | |
| --- | --- |
| Minutes | Zinc Diffusion, Moles/Liter* |
| 40 | $1.26 \times 10^{-5}$ |
| 60 | $1.31 \times 10^{-5}$ |
| 80 | $1.41 \times 10^{-4}$ |
| 100 | $2.24 \times 10^{-4}$ |
| 120 | $2.82 \times 10^{-4}$ |
| 140 | $3.16 \times 10^{-4}$ |
| 160 | $3.55 \times 10^{-4}$ |
| 180 | $3.98 \times 10^{-4}$ |
| 200 | $4.47 \times 10^{-4}$ |
| 220 | $5.00 \times 10^{-4}$ |
| 240 | $5.62 \times 10^{-4}$ |
| 260 | $5.62 \times 10^{-4}$ |
| 280 | $7.08 \times 10^{-4}$ |
| 300 | $7.08 \times 10^{-4}$ |
| 320 | $7.08 \times 10^{-4}$ |

| B. Diffusion Through Ethylene-Acrylic Acid Copolymer | |
| --- | --- |
| Hours | Zinc Diffusion, Moles/Liter* |
| 0 | 0 |
| 6 | 0 |
| 10 | 0 |
| 20 | $2.24 \times 10^{-5}$ |
| 30 | $1.14 \times 10^{-5}$ |
| 40 | $3.16 \times 10^{-5}$ |
| 50 | $5.00 \times 10^{-5}$ |
| 60 | $7.90 \times 10^{-5}$ |
| 70 | $1.12 \times 10^{-4}$ |
| 80 | $1.12 \times 10^{-4}$ |
| 90 | $1.41 \times 10^{-4}$ |
| 100 | $1.41 \times 10^{-4}$ |
| 110 | $1.99 \times 10^{-4}$ |
| 120 | $2.80 \times 10^{-4}$ |
| 130 | $2.80 \times 10^{-4}$ |
| 140 | $2.80 \times 10^{-4}$ |

*This test can detect as little as $1.00 \times 10^{-6}$ moles/liter of zinc.

Thus, as may be seen, the present invention provides separator materials having the necessary strength, chemical resistance, electrolyte transport and other characteristics needed for applications involving long cycle lives under deep discharge conditions. Moreover, and significantly, the present invention likewise provides an analytical system for insuring that the preparation of the separator materials has been satisfactory so that the necessary intended cycle life should in fact be capable of being provided.

We claim:

1. A method of screening to determine the suitability of separator materials for secondary alkaline systems which comprises subjecting the separator material to the environment of normally operating secondary alkaline cells for a minimum of 20 full charge and discharge cycles and developing an elemental zinc x-ray map to determine whether penetration in fact resulted.

2. The method of claim 1 in which instantaneous zinc penetration analysis is determined potentiometrically and microprobe analysis is carried out to develop penetration information.

3. The method of claim 1 in which the environment comprises a potassium hydroxide electrolyte and a soluble zinc species.

4. The method of claim 1 wherein the separator material being screened comprises a selectively porous to electrolyte separator comprising a copolymer, one component of which is a relatively high molecular weight, non-hydrolyzable, non-oxidizable backbone and the other polymer component being intermittent pendant polar groups that are terminal.

5. The method of claim 4 wherein the backbone polymer component is a material selected from the group consisting of polyethylene, polypropylene and polystyrene.

6. The method of claim 4 wherein the backbone polymer component has a weight average molecular weight of at least 20,000.

7. The method of claim 4 wherein the polar groups are on the terminal carbon of a side chain.

8. The method of claim 4 wherein the terminal polar group is selected from the group consisting of amines, sulfonic acids, alcohols, carboxylic acids and nitrile groups.

9. The method of claim 4 wherein the copolymer is an ethylene-acrylic acid copolymer.

10. A method of screening to ascertain the suitability of separator materials for secondary alkaline systems which comprises subjecting a sample of the separator material to the following tests:
(a) placing the separator material in a receptacle with an overlying layer of water, passing an inert gas upwardly through the separator material and determining the gas pressure at which bubbles in the water result,
(b) determining the average pore size,
(c) determining the resistivity value, (d) exposing the separator material to an alkaline electrolyte at elevated temperatures for an extended period of time and analyzing the separator materials by infrared, and scanning electron microscopy, and
(e) subjecting the sample to the environment of a normally operating secondary alkaline cell for a minimum of 20 full charge and discharge cycles and developing an elemental zinc x-ray map to determine whether penetration in fact resulted, and
(f) determining the rate of zinc diffusion potentiometrically.

* * * * *